United States Patent [19]

Baird, Jr. et al.

[11] 4,224,262
[45] Sep. 23, 1980

[54] CROSSLINKED COPOLYMER OF AN OLEFIN AND VINYL ALCOHOL

[75] Inventors: William G. Baird, Jr., Spartanburg; LeRoy Pike, Inman, both of S.C.

[73] Assignee: W. R. Grace & Co., Duncan, S.C.

[21] Appl. No.: 931,634

[22] Filed: Aug. 7, 1978

[51] Int. Cl.$^2$ .................. B29C 25/00; C08F 8/12
[52] U.S. Cl. .................. 264/22; 204/159.14; 525/60; 525/61; 525/62
[58] Field of Search .................. 526/7, 8, 10; 204/159.14; 264/22; 525/60, 62

[56] References Cited

U.S. PATENT DOCUMENTS

| | | | |
|---|---|---|---|
| 2,897,127 | 7/1959 | Miller | 204/159.14 |
| 2,941,973 | 6/1960 | Kumnick et al. | 526/7 |
| 3,082,194 | 3/1963 | Imperiale et al. | 526/8 |
| 3,734,843 | 5/1973 | Tubbs | 204/159.14 |
| 3,923,757 | 12/1975 | Salyer et al. | 526/8 |

FOREIGN PATENT DOCUMENTS 140557 12/1973 Japan .

*Primary Examiner*—Stanford M. Levin
*Attorney, Agent, or Firm*—John J. Toney; William D. Lee, Jr.; John B. Hardaway

[57] ABSTRACT

A crosslinked copolymer of an olefin and vinyl alcohol is produced by crosslinking a copolymer of the olefin and a vinyl ester to produce a crosslinked precursor, hydrolyzing the crosslinked precursor copolymer to produce a crosslinked copolymer of an olefin and vinyl alcohol.

12 Claims, No Drawings

CROSSLINKED COPOLYMER OF AN OLEFIN AND VINYL ALCOHOL

BACKGROUND OF THE INVENTION

This invention relates generally to the art of polymers and more particularly to the art of polymeric packaging films.

Polymeric films are ideally suited for packaging materials because of the ease of fabrication thereof and because of the ability of some polymeric films to maintain a packaged product in a desirable or unaffected condition. Particularly associated with the preservation of food articles is the ability of many polymeric films to resist the permeation of deleterious atmospheric gases into the contained product. One particular material which has been extremely successful for packaging food articles is a copolymer of vinylidene chloride with one or more other monomers usually vinyl chloride. This copolymer is normally referred to commercially as saran. Saran has many characteristics, however, which make it a less than totally satisfactory packaging material. The chief disadvantage of saran is the difficulty associated with the forming of film products from resin melts. Another questionable aspect of saran is the composition thereof which belongs to a broad class of organic halides which are being seriously questioned from a health and environmental standpoint.

A proposed replacement for saran as a material resistant to oxygen permeation is the hydrolyzed product of ethylene and vinyl acetate. This hydrolysis product is essentially a copolymer of ethylene and vinyl alcohol since the hydrolysis is normally greater than 96 percent complete. Copolymers of ethylene and vinyl alcohol and processes for producing them are fully described in U.S. Pat. Nos. 2,386,347 and 3,585,177 herewith incorporated by reference. A process for forming such a composition into a film is described by Chiba et al in U.S. Pat. No. 3,419,654 also herewith incorporated by reference.

Films composed of copolymers of ethylene and vinyl alcohol have been found to have a permeability to oxygen which is comparable to that of commercial saran while not possessing any halide moieties within the polymer structure.

A problem, however, with copolymers of ethylene and vinyl alcohol, while posssessing excellent low oxygen permeability characteristics, is the effect that moisture has upon the desirable properties of the copolymer. Copolymers of ethylene and vinyl alcohol are soluble to some extent in water and are affected by moisture such that while retaining dimensional integrity the resistance to oxygen transmission is almost completely diminshed. Thus any use of such copolymers for an application where low oxygen permeability is required must include measures to prevent moisture from coming into contact with the copolymer and must totally preclude the use of such copolymer in contact with a moisture bearing food article.

SUMMARY OF THE INVENTION

It is thus an object of this invention to provide a new packaging material having high resistance to oxygen permeation.

It is a further object of this invention to provide a new packaging polymer film which possesses the desirable attributes of the prior art copolymer of ethylene and vinyl alcohol but which does not possess the undesirable characteristic of being deleteriously affected by moisture.

It is a still further object of this invention to provide a crosslinked copolymer of an olefin and vinyl alcohol and process for producing such a crosslinked copolymer.

It is a further and more particular object of this invention to provide a crosslinked copolymer of ethylene and vinyl alcohol and a process for producing such a copolymer.

These, as well as other objects, are accomplished by a copolymer and particularly a copolymer in the form of a film of an olefin and vinyl alcohol formed by crosslinking a copolymer of the olefin and a vinyl ester, crosslinking the copolymer to produce a crosslinked precursor and hydrolyzing the precursor to produce a copolymer of the olefin and vinyl alcohol.

DETAILED DESCRIPTION

In accordance with this invention it has been found that a crosslinked olefin vinyl alcohol copolymer possesses the beneficial and desirable characteristics of the prior art copolymer of ethylene and vinyl alcohol, while simultaneously possessing a resistance to moisture such that the oxygen permeability characteristics are not adversely and deleteriously affected by contact with moisture and moisture containing objects.

Attempts to produce a crosslinked product of ethylene and vinyl alcohol are unsuccessful when using conventional techniques to attempt crosslinking of the copolymer. Such attempts are ineffective because prior art crosslinking techniques fail to produce crosslinking in the copolymers of ethylene and vinyl alcohol.

Thus in accordance with this invention it has been found that a crosslinked copolymer of an olefin and vinyl alcohol can be produced by beginning with a precursor copolymer of an olefin and a vinyl ester. The copolymer of the olefin and vinyl ester is crosslinked by well known techniques to produce a crosslinked precursor to the hydrolyzed product. The crosslinked precursor is hydrolyzed to produce a crosslinked copolymer of the olefin and vinyl alcohol.

Olefins useful within the copolymer of this invention are the lower mono-olefins, i.e., ethylene, propylene, butene-1 and butylene. While higher olefins may be utilized, such higher olefins are deleteriously affected by radiation and are generally not preferred for use in this invention. While copolymers of olefins and vinyl esters are broadly the operable materials within this invention, the remaining description will be given with reference to copolymers of ethylene and vinyl esters, since ethylene is a preferred olefin for use within the invention. This, however, is not to be construed as limiting the invention to ethylene copolymers.

The process of this invention is preferably carried out by first forming a film or other desirable geometry from a copolymer of ethylene and vinyl ester and crosslinking the film by known techniques. The crosslinked film is then hydrolyzed to bring about a film of the desired product. The desired product may then be oriented by known techniques or otherwise treated by prior art processes to produce a packaging material with desirable characteristics.

The precursor copolymer of ethylene and vinyl ester is selected to preferably have a molar percentage of 50 percent for each constituent. The molar percentage, however, may actually vary within the range of about 10 to 90 mole percent for each constituent and remain within the scope of this invention. Copolymers of less than 10 percent ethylene are difficult to form while those of greater than 90 percent are deficient in gas transmission characteristics.

The preferred vinyl ester for utilization within the copolymer precursor is an ethylene vinyl acetate copolymer. The vinyl ester, however, may be a vinyl ester of an aliphatic monobasic acid having from 1 to 8 carbon atoms. The precursor copolymer of ethylene and vinyl acetate is selected to preferably have a number average molecular weight above about 15,000.

The crosslinking reaction is carried out by techniques conventionally utilized for crosslinking copolymers of ethylene and vinyl esters such as the processes described in U.S. Pat. No. 3,741,253 to Harri J. Brax et al and U.S. Pat. No. 2,877,500 to Rainer et al. Crosslinking is preferably accomplished by irradiation but may be accomplished utilizing peroxides as are well known in the art and as is further discussed below. The term "crosslinking" is utilized within this disclosure refers to the union of polymer molecules by a system involving primary chemical bonds to have the effect of binding a polymer into a single network so that it becomes functionally a single molecule. The precursor copolymer utilized in this invention is preferably crosslinked so as to have at least one crosslink per weight average molecule. While the degree of crosslinking cannot be directly measured, the effect thereof is measured by solubility techniques described within the example at the end of the disclosure.

Crosslinking by irradiation can be accomplished by various techniques. There can be utilized electrons, x-rays, and radiation of actinic origin such as ultra-violet light having a wave length above about 2,000 angstroms and below about 2,700 angstroms. Preferably, however, electrons of at least $10^5$ electron volts energy are applied for crosslinking the copolymer of ethylene and the vinyl ester. The irradiation source can be a Van de Graaff type electron accelerator having an operating voltage of about 2 megavolts at a power output of about 5 to 10 kilowats. Preferably, however, the source of electrons is an electron accelerator powered by an insulated core transformer having an accelerating voltage from about 500 to about 3,000 kilovolts.

The adsorbed radiation within the material of interest is stated by the use of the term "RAD". The RAD is defined as the energy dosage level of 100 ergs per gram imparted by the ionizing radiation to the irradiated material at the point of interest. The crosslinkable copolymer of ethylene and vinyl ester utilized in this invention will undergo crosslinking at a doage level within the range of about 1 to about 50 megarads. A dosage level significantly less than 1 megarad is not sufficient to produce the desired number of crosslinks per molecule unless some type of irradiation crosslinking enhancer is utilized. A preferred dosage level is within the range of about 4 to 10 megarads.

Crosslinking may alternatively, but less preferably, be brought about utilizing chemical crosslinking agents. Such chemical crosslinking agents are well known in the art as is exemplified by U.S. Pat. No. 2,528,523 to Kent which is herewith incorporated by reference. When using chemical crosslinking agents, such as dicumyl peroxide, a film is initially formed and then contacted by the crosslinking agent since after crosslinking the film or crosslinked material can no longer be melt formed into a film.

By the process of this invention the crosslinked precursor is hydrolyzed by known techniques to form the ethylene vinyl alcohol copolymer. Preferably the reaction is carried out with methanol using an excess of sodium hydroxide to catalyze the hydrolysis reaction. This reaction is also referred to as a transesterification reaction on page 680 of *Organic Chemistry*, second edition Morrison and Boyd, Boston 1966 which is herewith incorporated by reference. The hydrolysis reaction is also referred to as saponification. The film thus crosslinked as above is passed through a reaction vessel containing the reaction mixture in order to complete the formation of the polymer of ethylene and vinyl alcohol. Hydrolysis or alcoholysis of the ethylene vinyl ester copolymer is carried out by merely contacting the copolymer with a primary alcohol such as methanol or ethanol and an excess of catalyst such as an alkali hydroxide or a mineral acid. The reaction may be carried out at room temperature but preferably a temperature of 30° to 100° C. is used in order to enhance the reaction rate. The hydrolysis may be partial or complete depending upon the catalyst and the time and temperature of reaction. The greater the percentage of vinyl ester in the copolymer, the more rapidly the rate of hydrolysis. Also alkali hydroxide catalyst give a more rapid rate of hydrolysis than mineral acid catalysts. For purposes of this invention it is desirable to carry the hydrolysis substantially to completion, i.e., greater than 96 percent.

The solubility of the ethylene vinyl ester copolymer within the reaction mixture will vary with vinyl ester content, degree of crosslinking, type of alcohol and temperature. Higher vinyl ester contents as well as higher degrees of crosslinking correspond to lower solubility. The crosslinked precursor is less soluble in high molecular weight alcohols than in lower molecular weight alcohols. The particular process parameters must be chosen in accordance with the desired results. In some instances it might be desirable to entirely dissolve the crosslinked precursor within the reaction solution and to precipitate the crosslinked product. When dissolving and precipitating to form a final product, the precipitate is formed into a film for other desirable geometry by compressing and heating to form a generally sintered article. If it is desired to hydrolyze a film without dissolution occurring the particular process parameter must be chosen to prevent significant dissolution of the crosslinked precursor. For example, a low degree of crosslinking brought about by 1 MR of radiation would require the use of isopropyl alcohol while a 10 MR product may be contacted with ethanol without dissolution.

Having generally described the process and product of this invention the following specific example is given as a further illustration thereof.

EXAMPLE

Film samples containing approximately 26 grams of a copolymer of ethylene and vinyl acetate having a vinyl acetate content of 45 mole percent were irradiated to various levels using electron irradiation as a means for crosslinking. After irradiation the materials were hydrolyzed at 50° C. by contacting with a methanol solution containing four weight percent sodium hydroxide. The materials were totally dissolved during the hydrolysis process and were precipitated using cold water. The solubility utilizing toluene as a solvent and ethanol was measured and reported as percent gel, i.e. the weight percent of the solid remaining after refluxing with the solvent. The gel content is an indirect measurement of the degree of crosslinking. Specimens of each hydrolyzed sample were pressed into a film approximately 6 mils in thickness. The oxygen transmission rates of each sample were measured by ANSI/ASTM technique D 1434-75 in both the wet and dry state. The results of this investigation are reported in the Table below.

TABLE

| Sample | Gauge, mil | Dose, MR | Oxygen Transmission Rate/mil Dry, cc/m² | Wet, cc/m² | Gel, %* | Gel, %** | VA Content, % |
|---|---|---|---|---|---|---|---|
| 1 | 5.6 | 0 | 48 | 98 | 0 | 53.7 | 1.2 |
| 2 | 5.5 | 3.0 | Poor sample | — | 32.8 | 56.3 | — |
| 3 | 5.3 | 8.0 | 50 | 52 | 74.3 | 63.0 | 1.3 |
| 4 | 6.5 | 11.5 | Poor Sample | — | 81.2 | 66.9 | — |
| 5 | 6.0 | 15.1 | 52 | 54 | 84.5 | 65.5 | 1.6 |

*toluene solvent before hydrolysis
**ethanol/$H_2O$ 75/25 by volume after hydrolysis Samples 2 and 4 gave poor transmission results due to pin hole defects. The remaining samples, however, vividly demonstrate the beneficial effect of this invention particularly with regard to moisture resistance. The last column indicates the amount of vinyl acetate remaining after hydrolysis. In each event the hydrolysis was essentially greater than 98% complete.

It is thus seen that this invention provides a new packaging material having high resistance to oxygen permeation and which retains this resistance in the presence of moisture. It is further seen that a novel process for producing such a product has been provided by this invention. While many details of the invention are specified in the above description, such details are subject to wide variation within the scope of this invention as is measured by the following appended claims.

What is claimed is:

1. A process for forming a film of a crosslinked copolymer of an olefin and vinyl alcohol comprising the steps of:
   providing a precursor film comprised of a copolymer of said olefin and a vinyl ester, said copolymer having from 10 to 90 mole percent of said olefin and said vinyl ester;
   irradiating said precursor film to form a crosslinked precursor film; and
   hydrolyzing said crosslinked precursor film to produce said film of a crosslinked copolymer of an olefin and vinyl alcohol.

2. The process of claim 1 wherein said olefin is ethylene.

3. The process according to claim 1 wherein said vinyl ester is a vinyl ester of an aliphatic mono-basic acid having from 1 to 8 carbon atoms.

4. The process according to claim 3 wherein said vinyl ester is vinyl acetate.

5. The process according to claim 2 wherein said copolymer of ethylene and vinyl acetate has a number average molecular weight above about 15,000.

6. The process according to claim 1 wherein said step of irradiating is carried out by impinging ionizing radiation upon said precursor.

7. The process according to claim 6 wherein said ionizing radiation is electron irradiation at an energy of about $10^5$ electron volts and said precursor film is irradiated to a dosage level of at least 1 megarad.

8. The process according to claim 1 wherein said step of hydrolyzing is carried out utilizing an alcohol reactant in the presence of a catalyst.

9. The process according to claim 1 wherein said step of hydrolyzing is carried out to the extent of at least 96 percent completion.

10. The process according to claim 1 including the further step of orienting the crosslinked product.

11. The process according to claim 1 wherein said step of providing comprises extruding a film.

12. A film comprised of a crosslinked copolymer of an olefin and vinyl alcohol produced by the process of claim 1.

* * * * *